(12) United States Patent
Huang et al.

(10) Patent No.: US 7,715,392 B2
(45) Date of Patent: May 11, 2010

(54) SYSTEM AND METHOD FOR PATH COMPRESSION OPTIMIZATION IN A PIPELINED HARDWARE BITMAPPED MULTI-BIT TRIE ALGORITHMIC NETWORK SEARCH ENGINE

(75) Inventors: Lun Bin Huang, San Diego, CA (US); Nicholas Julian Richardson, San Diego, CA (US); Suresh Rajgopal, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1798 days.

(21) Appl. No.: 10/317,338

(22) Filed: Dec. 12, 2002

(65) Prior Publication Data

US 2004/0114587 A1 Jun. 17, 2004

(51) Int. Cl.
*H04L 12/56* (2006.01)
(52) U.S. Cl. .................. 370/392; 370/474; 370/475
(58) Field of Classification Search ........... 370/392, 370/474, 475
See application file for complete search history.

(56) References Cited

U.S. PATENT DOCUMENTS

| | | | |
|---|---|---|---|
| 5,781,772 A | | 7/1998 | Wilkinson, III et al. |
| 6,011,795 A | * | 1/2000 | Varghese et al. ............ 370/392 |
| 6,581,106 B1 | * | 6/2003 | Dardini et al. .............. 709/242 |
| 6,928,430 B1 | * | 8/2005 | Chien et al. .................... 707/3 |
| 7,007,101 B1 | * | 2/2006 | Schwaderer ................ 709/238 |
| 2002/0159466 A1 | * | 10/2002 | Rhoades ..................... 370/408 |

FOREIGN PATENT DOCUMENTS

WO     WO 01/63852     8/2001

OTHER PUBLICATIONS

Masami Shishibori et al., "A Key Search Algorithm Using the Compact Patricia Trie", Oct. 1997, 1997 IEEE International Conference on Intelligent Processing Systems, pp. 1581-1584.*
Ruiz-Sanchez et al., "Survey and Taxonomy of IP Address Lookup Algorithms", IEEE Network, IEEE Inc., Mar. 2001, pp. 12-18, vol. 15, No. 2, New York, US.
Nilsson et al., "IP-Address Lookup Using LC-Tries", IEEE Journal on Selected Areas in Communications, IEEE Inc., Jun. 1999, pp. 1083-1092, vol. 17, No. 6, New York, US.

* cited by examiner

*Primary Examiner*—Jason E Mattis
(74) *Attorney, Agent, or Firm*—Lisa K. Jorgenson; William A. Munck (57) ABSTRACT

For use in a pipeline network search engine of a router, a path compression optimization system and method is disclosed for eliminating single entry trie tables. The system embeds in a parent trie table (1) path compression patterns that comprise common prefix bits of a data packet and (2) skip counts that indicate the length of the path compression patterns. The network search engine utilizes the path compression patterns and the skip counts to eliminate single entry trie tables from a data structure. Each path compression pattern is processed one stride at a time in subsequent pipeline stages of the network search engine. The elimination of unnecessary single entry trie tables reduces memory space, power consumption, and the number of memory accesses that are necessary to traverse the data structure.

21 Claims, 10 Drawing Sheets

SYSTEM AND METHOD FOR PATH COMPRESSION OPTIMIZATION IN A PIPELINED HARDWARE BITMAPPED MULTI-BIT TRIE ALGORITHMIC NETWORK SEARCH ENGINE

CROSS-REFERENCE TO RELATED APPLICATIONS

The present invention is related to those disclosed in the following U.S. non-provisional patent applications:

Patent application Ser. No. 10/313,174, filed on Dec. 6, 2002, entitled "Apparatus And Method Of Using Fully Configurable Memory, Multi-Stage Pipeline Logic And An Embedded Processor to Implement Multi-bit Trie Algorithmic Network Search Engine";

Patent application Ser. No. 10/313,416, filed on Dec. 6, 2002, entitled "Method For Increasing Average Storage Capacity In A Bit-Mapped Tree-Based Storage Engine By Using Remappable Prefix Representations And A Run-Length Encoding Scheme That Defines Multi-Length Fields To Compactly Store IP Addresses";

Patent application Ser. No. 10/313,854, filed on Dec. 6, 2002, entitled "Method For Increasing Storage Capacity In A Multi-Bit Trie-Based Hardware Storage Engine By Compressing The Representation Of Single-Length Prefixes"; and Patent application Ser. No. 10/313,395, filed on Dec. 6, 2002, entitled "A Mechanism To Reduce Lookup Latency In A Pipelined Hardware Implementation Of A Trie-Based IP Lookup Algorithm".

TECHNICAL FIELD OF THE INVENTION

The present invention is generally directed to routers in electronic communication networks and, more specifically, to trie algorithmic network search engines.

BACKGROUND OF THE INVENTION

Electronic communication networks comprise network routers that are capable of sending and receiving electronic data in packets. Each network router directs an incoming information packet to the next neighboring router that is on a route of the intended destination of the packet. Each network router has to perform prefix lookup operations on a routing table in order to determine the appropriate "next hop" address for the packet according to the destination IP (Internet Protocol) prefix of the packet.

Figure 1:
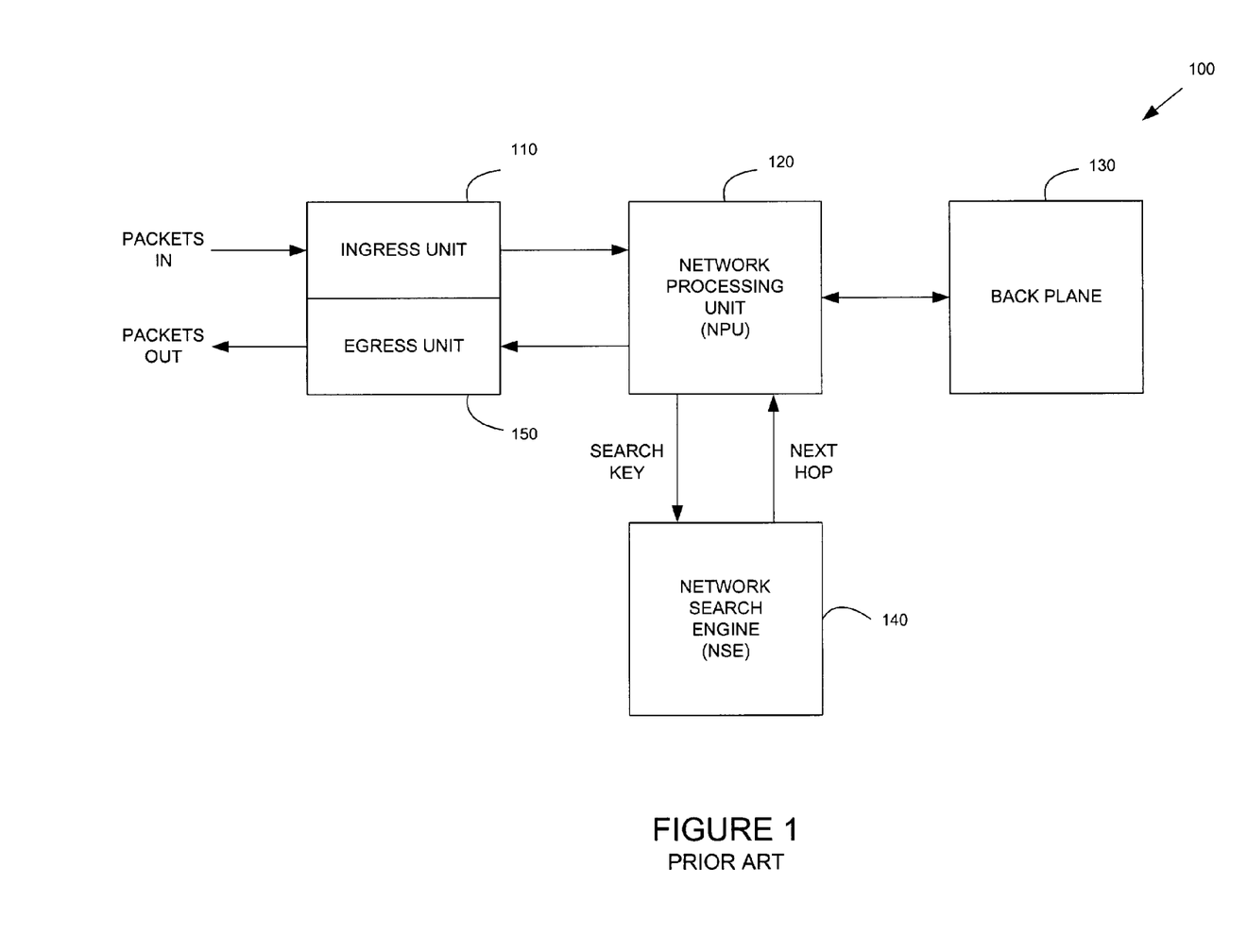
FIG. 1 illustrates a block diagram of an exemplary prior art router system.

The prefix lookup operations are done either by a network processor or, more commonly, by a separate device that is referred to as a Network Search Engine. The task of a network processor or a Network Search Engine is maintain and perform searches on a routing table that consists of destination prefixes and their associated "next hop" information. An exemplary prior art router system 100 is shown in FIG. 1. A packet enters an Ingress Unit 110 and is passed to a Network Processing Unit (NPU) 120. NPU 120 is coupled to Back Plane Unit 130 and to Network Search Engine (NSE) 140. NPU 120 sends a search key for the packet to NSE 140. NSE 140 performs a search of a routing table (not shown) within NSE 140 and returns the "next hop" information to NPU 120. NPU 120 then sends the packet to its "next hop" destination through Egress Unit 150.

Figure 2:
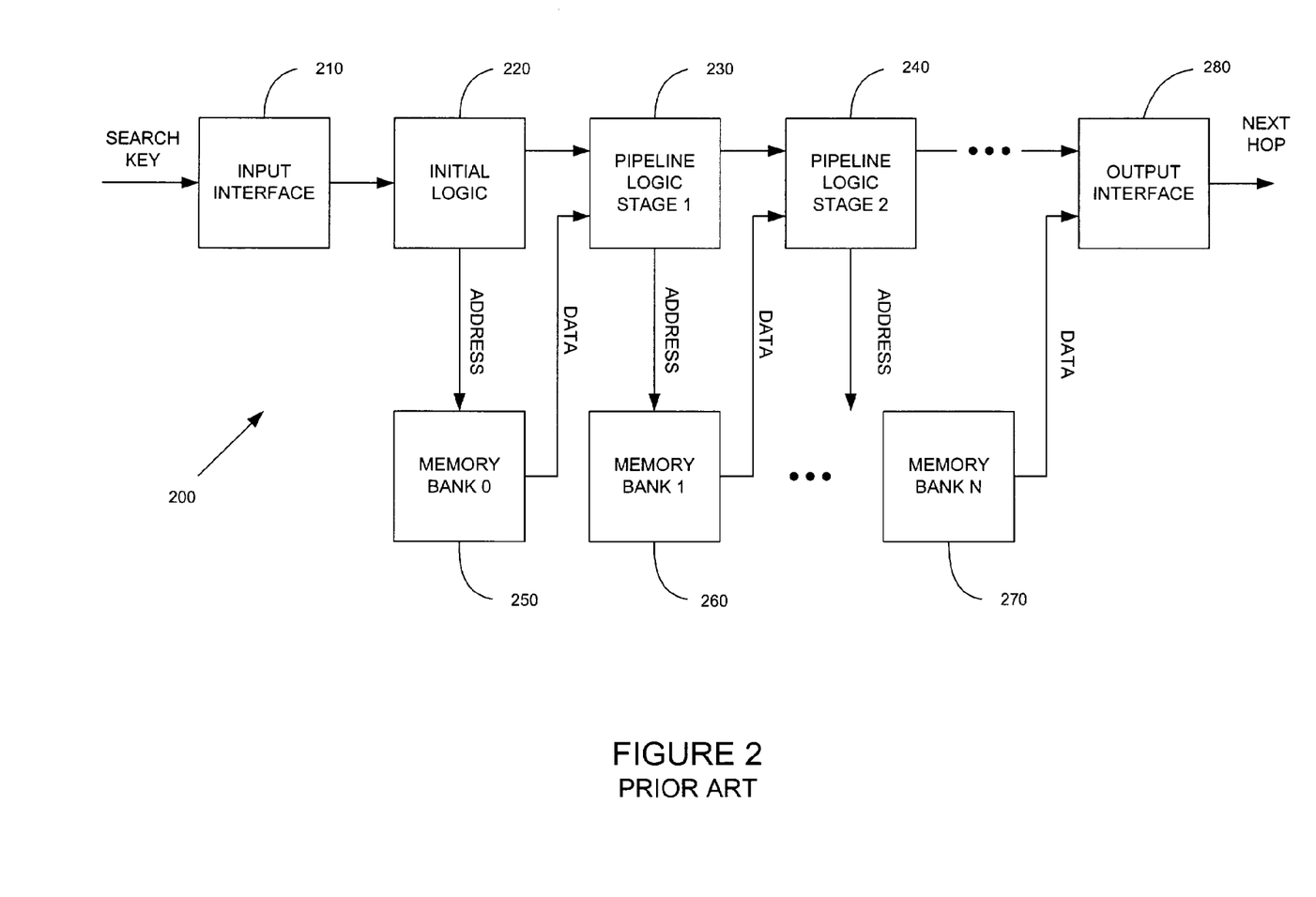
FIG. 2 illustrates a block diagram of an exemplary prior art pipelined hardware bitmapped multi-trie algorithmic network search engine.

Various types of network search engines exist that are capable of performing the task of searching a routing table. The present invention is directed to improvements in a network search engine of the type that is capable of using pipelined hardware that employs multiple banks of memories to implement bitmapped multi-bit trie algorithmic search algorithms. FIG. 2 illustrates a block diagram of a prior art pipelined hardware bitmapped multi-bit trie algorithmic network search engine 200. Network search engine 200 comprises an input interface 210, an initial logic unit 220, a plurality of pipelined logic units (230, 240), a plurality of memory banks (250, 260, 270) and an output interface 280.

In a typical pipelined hardware network search engine such as that shown in FIG. 2 a search on a search key is done in stages. The pipeline logic in each stage of the pipelined logic units (230, 240) processes some portion of the search key. As the bits in the search key are examined, a decision is made (1) to terminate the search because either a final match is found or no match is found, or (2) to continue to the next stage. The search is continued to the next stage by generating and sending an address to an associated memory bank and performing a memory read.

If the decision is to continue the search, the data that is read from the memory is sent to pipeline logic unit of the next stage and the next portion of the search key is processed. The search process continues until either a final match is found or no match is found.

Various software algorithms have been developed to reduce the amount of memory that must be used to store the routing tables and to reduce the number of memory accesses that must be made during lookup operations. A "trie" is a digital search tree data structure and algorithm that represents binary strings in which the bits in a string determine the direction of the branches of the search tree. The term "trie" is taken from the middle four letters of the word "retrieval." A trie algorithm hierarchically organizes the destination IP prefixes (according to the numeric value of the prefixes) into an easily searchable tree structure.

A binary trie has at most two branches, while a multi-bit trie consumes multiple bits at a time and has several branches. Each branch of a multi-bit trie leads to the next level. The number of bits consumed in multi-bit trie is referred to as a "stride." A uniform width stride trie is a trie in which all of the strides have the same width (except for the last stride which is the remainder of the prefix length divided by the stride width.) A multi-bit trie algorithm works by storing and retrieving the prefixes in a uniform width stride trie or in a variable width stride trie.

The multi-bit trie bitmap algorithm groups all branches in the same level with the same "parent" stride value in a table. This is called a "trie table." If the prefix is divided into an array of n-bit strides, the maximum possible entries in the next level trie table is $2^n$. The next level trie table is sometimes referred to as a "child" trie table. The algorithm encodes all next level stride values from the same parent into a $2^n$-bit data field and stores it in the entry in the parent trie table, along with the base address of the next level ("child") trie table. The data structure storing this information is called a "trie-node."

Table compression is achieved by allocating memory for the actual number of entries that exist, instead of the maximum size of $2^n$. For the last stride of each prefix, a similar type of data structure is used, except in this case the pointer is pointing to a table containing "next hop" information, instead of a next level trie table. This type of entry is called an "end-node."

Routing table lookup is also performed in same width strides. The value in the next level stride is decoded and processed with the data field in its parent table entry. If it is determined that a stored route with the same stride value exists, an index is calculated using the information. The table pointer and this index form an address leading to the next level trie table entry and the search continues. If a match is not found, the search terminates without success. If a search reaches an end-node and a match is found, the search is a success and the associated "next hop" information is read from the "next hop" table.

In a typical routing table other prefixes with common high order bits (strides) will share parent trie tables. This reduces the amount of memory required to store the prefixes. Also in a typical routing table sometimes there are many single entry intermediate trie-tables (non-leaf tables). This happens when a number of prefixes share a string of high order bits (strides). During lookup operations, these series of trie tables are accessed, one after another, until a matching leaf entry is found or until an end of the link is encountered.

In a prior art software based packet lookup devices such as a network processor unit, a method called "path compression" is used to reduce the level of trie tables to be accessed in the case of single entry trie tables. Path compression works by replacing a series of non-leaf single entry trie tables with the actual prefix patterns (strides) that the bitmaps in the trie tables represent and put into one location, along with the binary lengths (skip counts) of the patterns. Therefore during the search the network processor unit can perform only one memory access to retrieve the prefix pattern and determine the matching status of a multiple "stride-ful" of bits, instead of doing multiple memory accesses to a series of trie tables to check the same number of strides. This approach, however, has not been used in a pipelined hardware based device because of its apparent inconsistency with the normal pipeline flow.

Consider a prior art pipelined hardware search engine that does not use "path compression." The method employed by such a search engine for handling single entry trie tables wastes memory space, memory bandwidth, and power. For example, consider that the content of a trie table typically comprises a table header and one or more table entries. The table header holds a backtrack pointer (an address of the parent trie table entry). In the case in which a single entry trie table exists, the parent entry that points to a single entry table holds a bitmap with only one set-bit. The child trie table consists of one table header and one data entry. In a series of single entry trie tables, each subsequent child table's bitmaps also has one set-bit. A prior art pipelined hardware search engine uses memory space, memory bandwidth, and power to handle these types of single entry trie tables. If these tables could be eliminated the memory accesses to the otherwise single entry tables would also be eliminated. This would result in a significant savings in memory space, memory bandwidth, and power.

Therefore, there is a need in the art for an apparatus and method for optimizing path compression of single entry trie tables. There is a need in the art of an apparatus and method for saving memory space occupied by single entry trie tables and for saving memory bandwidth and power associated with accessing single entry trie tables in pipelined hardware network search engines.

SUMMARY OF THE INVENTION

To address the above-discussed deficiencies of the prior art, it is a primary object of the present invention to provide an apparatus and method for optimizing path compression of single entry trie tables in connection with a pipelined hardware bitmapped multi-bit trie algorithmic network search engine.

In an advantageous embodiment of the present invention, a network search engine in a router embeds common prefix bits of a data packet (referred to as "path compression patterns") and the length of the pattern (referred to as the "skip count") in a parent trie table entry. The invention provides a new set of formats that enable the network search engine to interpret and redefine the meaning of "path compression" entries. This enables the network search engine to eliminate a number of single entry trie tables from a data structure while preserving access to all the data in the data structure. The elimination of unnecessary single entry trie tables saves the memory space that would otherwise be occupied by the single entry trie tables. The elimination of unnecessary single entry trie tables also reduces the number of memory accesses that are necessary to traverse the data structure.

It is an object of the present invention to provide an optimized path compression process for eliminating unnecessary single entry trie tables in a data structure in a pipelined hardware network search engine.

It is another object of the present invention to provide an optimized path compression process for eliminating unnecessary single entry trie tables in a data structure to obtain a significant saving of memory space and memory bandwidth in a pipelined hardware network search engine.

It is yet another object of the present invention to provide an optimized path compression process for eliminating unnecessary single entry trie tables in a data structure to obtain a significant saving of power consumption in a pipelined hardware network search engine.

It is another object of the present invention to provide an optimized path compression process for eliminating unnecessary single entry trie tables in a data structure by encoding path compression patterns and skip counts in an associated parent trie table so that the optimized path compression process is compatible with a one pass prefix lookup process in which each pipeline logic stage and each memory bank is accessed only once for each lookup.

It is still another object of the present invention to provide an optimized path compression process for eliminating unnecessary single entry trie tables in a data structure by encoding path compression patterns and skip counts in an associated parent trie table to minimize table update overhead.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller might be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 to 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged network search engine.

The present invention is designed to provide an implementation that is compatible with a one-pass prefix lookup. This means that each pipeline logic unit and each memory bank is accessed only once for each lookup. The present invention is also designed to provide an implementation that minimizes table update overhead. This means that the present invention performs prefix insertion and deletion with minimal memory movements of existing entries.

The present invention accomplishes these design objectives by (1) encoding the path compression patterns in the associated parent node, and (2) placing the trie table immediately following the path compression process into the memory bank that the original trie table was expected to be in before the path compression process of the present invention was performed.

The present invention creates two new formats that are used to indicate "path compression" entities. An advantageous embodiment of the present invention in a pipelined hardware bitmapped multi-bit trie algorithmic network search engine defines a first trie table entry 320 (shown in FIG. 3B) and a second trie table entry 340 (shown in FIG. 3C) for a selected trie table (not shown). Trie table entry 300 (shown in FIG. 3A) is a prior art trie table entry. Trie table entry 300 comprises a "bitmap" data field 305, a "pointer" data field 310, and a "code" data field 315. Bitmap data field 305 contains the encoded values of a particular section of the prefixes stored in the selected trie table. The data in bitmap data field 305 is used to provide the information to locate the next entry in the following trie table (i.e., the trie table after the selected trie table). Pointer data field 310 contains the following trie table's base address. Code data field 315 contains the format of the current entry.

Figure 3A:
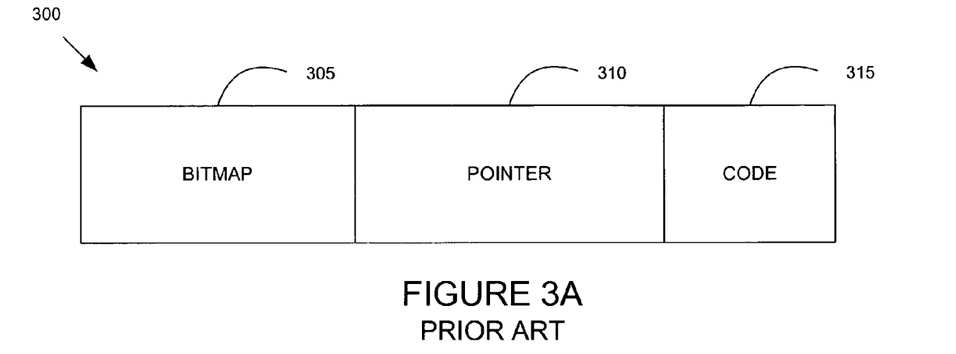
FIG. 3A illustrates a format of a prior art trie table entry comprising a bitmap data field, a pointer data field, and a code data field.

For purposes of explanation assume that bitmap data field 305 holds exactly one stride of data. For a stride width of four (4), the bitmap width is sixteen (16) (i.e., two (2) to the power of four (4)).

Figure 3B:
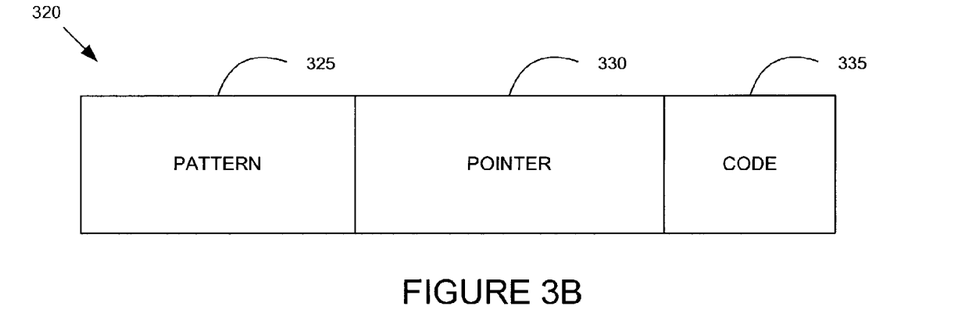
FIG. 3B illustrates a format of a first trie table entry of the present invention used for skip counts of n strides in accordance with the principles of the present invention.

The present invention comprises first trie table entry 320 and second trie table entry 340. First trie table entry 320 comprises a "pattern" data field 325, a "pointer" data field 330, and a "code" data field 335 as shown in FIG. 3B. First trie table entry 320 indicates a path compression entry with a skip count of n strides. For example, with a bitmap width of sixteen (16) and a stride width of four (4), four (4) strides of pattern can be held in one node (i.e., four (4) strides times four (4) bits per stride equals sixteen (16) bits). In this case the skip count is three (3). That is, there are three (3) skipped four (4) bit strides in addition to the normal four (4) bit stride for the last stage.

Figure 3C:
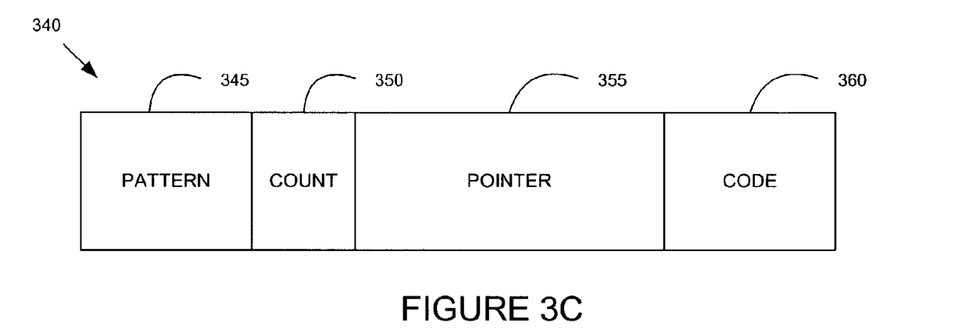
FIG. 3C illustrates a format of a second trie table entry of the present invention used for skip counts that range from one stride to (n−1) strides in accordance with the principles of the present invention.

Second table entry 340 comprises a "pattern" data field 345, a "count" data field 350, a "pointer" data field 355, and a "code" data field 360 as shown in FIG. 3C. Second trie table entry 340 indicates a "path compression" entry with a skip count from one stride to a skip count of (n−1) strides.

The skip count is stored in bitmap data field 305. Because bitmap data field 305 is not fully used when the skip count is less than n, the skip count can be encoded in the unused bits in count data field 350 as shown in FIG. 3C.

In order to more clearly provide an understanding of the operation of the present invention, the operation of the prior art pipelined hardware bitmapped multi-trie algorithmic network search engine shown in FIG. 2 will first be described. First, a search key is provided to input interface 210. Input interface 210 begins a search operation by sending the search key and a search command to initial logic unit 220. Initial logic unit 220 generates a memory address and performs a memory read on Memory Bank 0 (designated with reference numeral 250). Initial logic unit 220 sends (1) the search command, (2) the search key, and (3) the memory data (node data) that was read from Memory Bank 0 250 to Pipeline Logic Stage 1 (designated with reference numeral 230).

Pipeline Logic Stage 1 230 determines whether a match exists by decoding the trie node data from Memory Bank 0 250 and comparing it with the first segment (i.e., the first stride) of the search key. If the search result indicates that a matching prefix has been found and the search should not continue, then the search ends and Pipeline Logic Stage 1 230 sends the search result information of a "match" to output interface 280 through a signal line (not shown in FIG. 2). If the search result indicates that a matching prefix or child trie table has not been found, then the search ends and Pipeline Logic Stage 1 230 sends the search result information of "no match" to output interface 280 through a signal line (not shown in FIG. 2).

If the search result indicates that a matching child trie table has been found and that the search should continue, then Pipeline Logic Stage 1 230 generates a memory address and performs a memory read on Memory Bank 1 (designated with reference numeral 260). Pipeline Logic Stage 1 230 sends (1) the search command, (2) the search key, and (3) the memory data (node data) that was read from Memory Bank 1 260 to Pipeline Logic Stage 2 (designated with reference numeral 240). Pipeline Logic Stage 2 240 examines the data and the search process is repeated.

Finally, if the search process reaches the last pipeline stage represented by Pipeline Logic Stage N (not shown in FIG. 2) and Memory Bank N (designated with reference numeral 270), then the search process will terminate there and the search result is sent to output interface 280.

Figure 4:
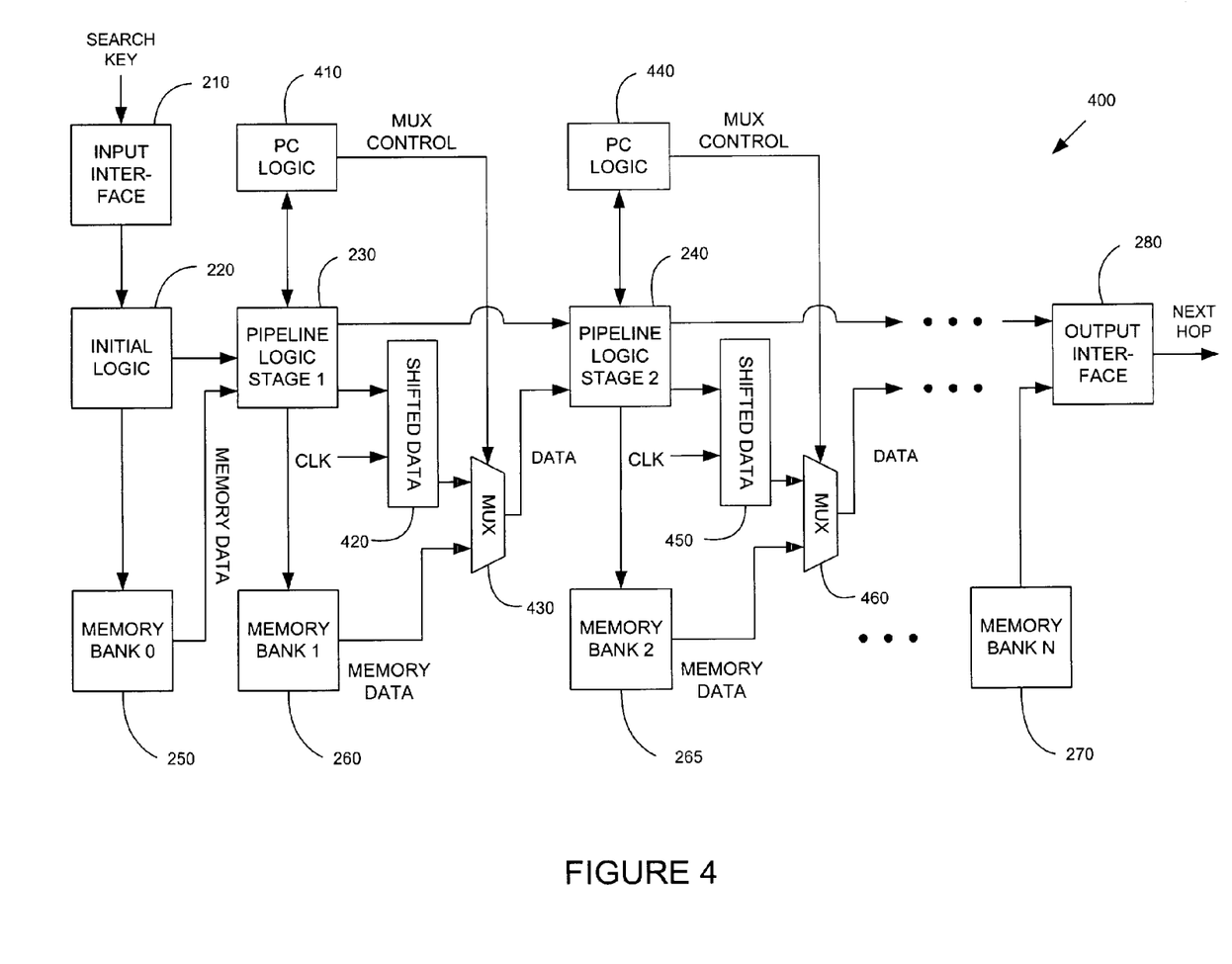
FIG. 4 illustrates a block diagram of a pipelined hardware bitmapped multi-bit trie algorithmic network search engine in accordance with the principles of the present invention.

FIG. 4 illustrates a block diagram of a pipelined hardware bitmapped multi-trie algorithmic network search engine 400 in accordance with the principles of the present invention. For clarity of explanation, the elements of network search engine 400 that are the same as elements of prior art network search engine 200 will be given the same reference numerals. Network search engine 400 comprises an input interface 210, an initial logic unit 220, a plurality of pipelined logic units (230, 240), a plurality of memory banks (250, 260, 265, 270) and an output interface 280. In addition, network search engine 400 comprises a plurality of PC logic units (410, 440), a plurality of shifted data storage units (420, 450), and a plurality of multiplexers (430, 460).

As shown in FIG. 4, the first stage of network search engine 400 comprises input interface 210, initial logic unit 220 and Memory Bank 0 250. The second stage of network search engine 400 comprises pipeline logic unit 230 (Pipeline Logic Stage 1), Memory Bank 1 260, PC logic unit 410, shifted data storage unit 420 and multiplexer 430. The third stage of network search engine 400 comprises pipeline logic unit 240 (Pipeline Logic Stage 2), Memory Bank 2 265, PC logic unit 440, shifted data storage unit 450 and multiplexer 460. Other stages of network search engine 400 (not shown) have the same structure as the second and third stages except that the output of the last memory bank (Memory Bank N 270) is coupled to output interface 280.

In each stage of network search engine 400 a PC logic unit (e.g., PC logic unit 410) searches for and detects the presence of a path compression optimization in its associated pipeline logic unit (e.g., Pipeline Logic Stage 1 230). The PC logic unit in each stage does this by searching for and detecting the new trie node formats of the present invention (i.e., first trie table entry 320 and second trie table entry 340). The PC logic unit in each stage then processes the path compression optimization. Depending upon the result of processing the path compression optimization, the PC logic unit may modify and control a normal search result (i.e., a search result obtained by an associated pipeline logic unit).

Each PC logic unit (410, 440) does not replace its associated pipeline logic stage (230, 240) in network search engine 400. Instead, as will be more fully described, each PC logic unit provides a supplemental function to detect and process path compression optimizations. When no path compression optimizations are detected, network search engine 400 operates in the same manner as network search engine 200.

When a PC logic unit detects a path compression optimization the portion of the search key that corresponds to the current pipeline logic stage, is compared with the corresponding portion of the associated path compression pattern (i.e., the data that was read from a previous memory bank).

If a match is found, (1) the memory read operation to the current memory bank is suppressed, and (2) the remaining unprocessed portion of the path compression pattern is latched and sent to the next pipeline logic stage.

Because (1) the path compression may comprise multiple stridefuls of data and (2) each pipeline logic unit and each PC logic unit processes only one stride of data at a time, the data that represents the remaining compression pattern is shifted before it is passed to the next stage.

The shifted data is stored in a shifted data storage unit and sent to the next pipeline logic unit through a multiplexer under the control of the current PC logic unit. The shifted data is used in the next pipeline logic unit instead of the memory data from the current memory bank.

The PC logic unit also updates the corresponding skip count (e.g., by decrementing the skip count by one). The skip count indicates how many pipeline logic stages are to be skipped. The PC logic units sends the updated skip count to the next pipeline logic unit via a signal line (not shown) when the shifted data is sent to the next pipeline logic unit.

The PC logic unit of the next stage then examines the shifted data and the corresponding portion (stride) of the search key to determine whether the match condition exists. The search process continues only if the associated portion of the search key matches the corresponding portion of the shifted data. Otherwise the search will terminate.

If the search continues and the remaining skip count is greater than zero, the PC logic unit (together with the pipeline logic unit) of the current stage (1) suppresses the memory read operation to the current memory bank, (2) updates the remaining skip count, (3) shifts the data that represents the remaining compression pattern, and (4) sends the search data to the next pipeline stage for further processing.

The processing of the path compression optimization ends when the skip count reaches zero. At that point a new memory address and read operation is performed at the current memory bank. The data and remaining search key is then sent to the next pipeline stage for processing and the normal search process is resumed.

For example, consider the following operation of network search engine 400 shown in FIG. 4. First, a search key is provided to input interface 210. Input interface 210 begins a search operation by sending the search key and a search command to is initial logic unit 220. Initial logic unit 220 generates a memory address and performs a memory read on Memory Bank 0 (designated with reference numeral 250). Initial logic unit 220 sends (1) the search command, (2) the search key, and (3) the memory data (node data) that was read from Memory Bank 0 250 to Pipeline Logic Stage 1 (designated with reference numeral 230). Pipeline Logic Stage 1 230 determines whether a match exists by decoding the trie node data from Memory Bank 0 250 and comparing it with the first segment (i.e., the first stride) of the search key. If the search result indicates that a matching prefix has been found and the search should not continue, then the search ends and Pipeline Logic Stage 1 230 sends the search result information of a "match" to output interface 280 through a signal line (not shown in FIG. 4). If the search result indicates that a matching prefix or child trie table has not been found, then the search ends and Pipeline Logic Stage 1 230 sends the search result information of "no match" to output interface 280 through a signal line (not shown in FIG. 4).

If the search result indicates that a matching child trie table has been found and that the search should continue, then Pipeline Logic Stage 1 230 generates a memory address and performs a memory read on Memory Bank 1 (designated with reference numeral 260). If PC logic unit 410 does not detect a path compression optimization, then PC logic unit 410 causes Pipeline Logic Stage 1 230 to send (1) the search command, (2) the search key, and (3) the memory data (node data) that was read from Memory Bank 1 260 to Pipeline Logic Stage 2 (designated with reference numeral 240). The memory data (node data) from Memory Bank 1 260 passes through multiplexer 430 under the control of PC logic unit 410. Pipeline Logic Stage 2 240 then examines the data and the search process is repeated.

Now consider the case in which PC logic unit 410 does detect a path compression optimization. PC logic unit 410 suppresses the normal memory read operation to Memory Bank 1 260. PC logic unit 410 controls multiplexer 430 to suppress the transfer of memory data (node data) from Memory Bank 1 260 to Pipeline Logic Stage 2 240. Instead, PC logic unit 410 causes Pipeline Logic Stage 1 230 to shift the data that represents the remaining compression pattern. The shifted data is stored in shifted data storage unit 420. PC logic unit 410 controls multiplexer 430 to send the shifted data to Pipeline Logic Stage 2 240.

PC logic unit 410 then updates the skip count (e.g., by decrementing the skip count by one) and causes Pipeline Logic Stage 1 230 to send the updated skip count Pipeline Logic Stage 2 240. Pipeline Logic Stage 2 240 and PC logic unit 440 then continue the search process.

Assume that PC logic unit 440 determines that the skip count has reached zero. Then PC logic unit 440 ends the processing of the path compression optimization. PC logic unit 440 causes Pipeline Logic Stage 2 240 to perform a new memory address and read operation a Memory Bank 2 265. In this case memory access was suppressed for only one memory bank (i.e., Memory Bank 1 260). PC logic unit 440 causes Pipeline Logic Stage 2 240 to send the data and remaining search key to the next pipeline stage (not shown in FIG. 4) for processing. PC logic unit 440 also controls multiplexer 460 to allow the transfer of memory data (node data) from Memory Bank 2 265 to the next pipeline stage (not shown in FIG. 4). The normal search process is resumed.

Finally, if the search process reaches the last pipeline stage represented by Pipeline Logic Stage N (not shown in FIG. 4) and Memory Bank N (designated with reference numeral 270), then the search process will terminate there and the search result is sent to output interface 280.

Figure 5A:
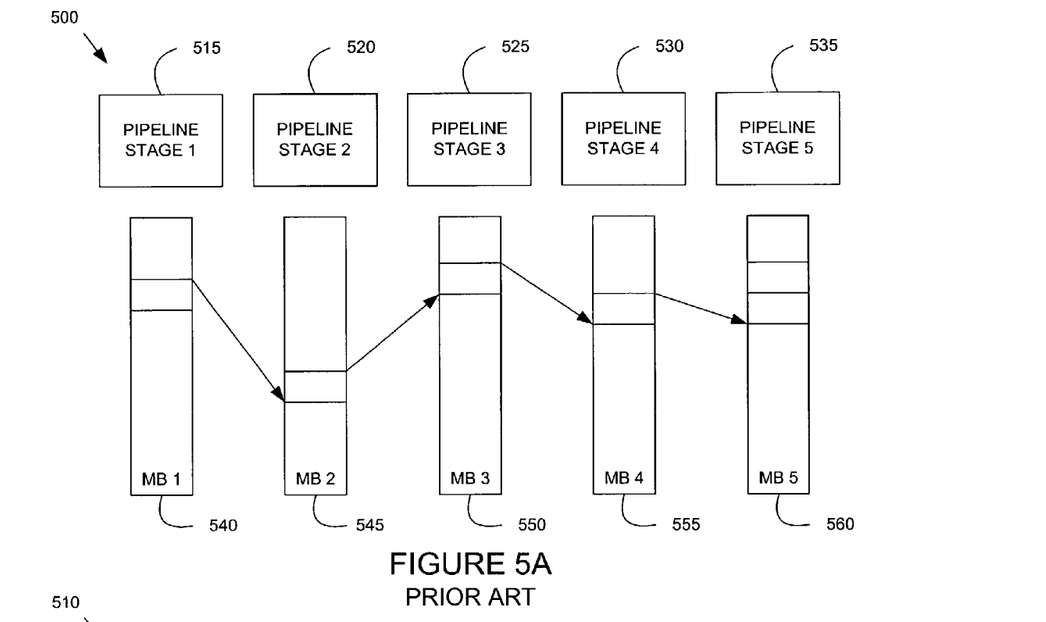
FIG. 5A illustrates an exemplary prior art memory structure of a pipelined hardware bitmapped multi-bit trie algorithmic network search engine before the application of an optimized path compression process in accordance with the principles of the present invention.

FIG. 5A illustrates an exemplary prior art memory structure 500 of a pipelined hardware bitmapped multi-bit trie algorithmic network search engine before the application of optimized path compression of the present invention. Memory structure 500 comprises five pipeline stages 515, 520, 525, 530 and 535. Memory structure 500 also comprises five memory banks 540, 545, 550, 555 and 560 respectively associated with the five pipeline stages.

Before the optimized path compression process of the invention is performed, memory bank 540 contains a pointer that points to a memory location in memory bank 545. Memory bank 545 contains a pointer that points to a memory location in memory bank 550. Memory bank 550 contains a pointer that points to a memory location in memory bank 555. Memory bank 555 contains a pointer that points to a memory location in memory bank 560.

Figure 5B:
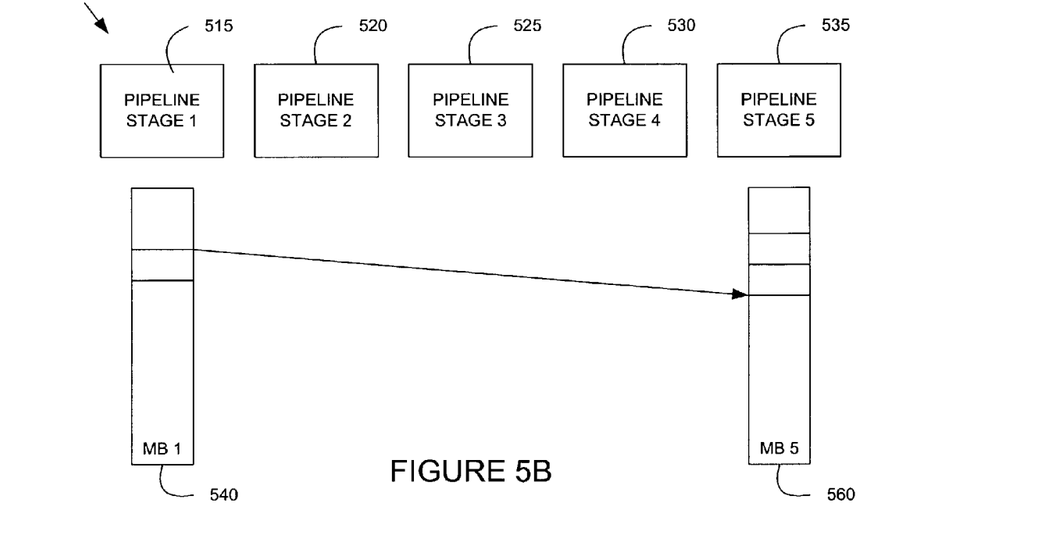
FIG. 5B illustrates an exemplary memory structure of a pipelined hardware bitmapped multi-bit trie algorithmic network search engine after the application of an optimized path compression process in accordance with the principles of the present invention.

FIG. 5B illustrates an exemplary memory structure 510 of a pipelined hardware bitmapped multi-bit trie algorithmic network search engine after the application of optimized path compression of the present invention. After the optimized path compression process of the invention has been performed, memory bank 540 contains a pointer that points to a memory location in memory bank 560. It is no longer necessary to sequentially access memory banks 545, 550 and 555 to reach the memory location in memory bank 560. Memory bank 540 reaches directly to memory bank 560. In this case the skip count is three (3). Three (3) pipeline stages (520, 525, 530) are skipped.

Pointer data field 310 in trie table entry 300 usually holds the base address of the next trie table at the next pipeline stage. Assume that a PC logic unit detects a path compression optimization in Stage S and performs the optimized path compression process of the invention. If the skip count is equal to n strides, pointer data field 330 of first trie table entry 320 holds the base address of the next trie table at pipeline stage (S+n+1) after the optimized path compression process has been performed. If the skip count ranges from one stride to (n−1) strides, pointer data field 355 of second trie table entry 340 holds the base address of the next trie table (from pipeline stage (S+2) for a skip count of one stride to pipeline stage (S+n) for skip count of (n−1) strides) after the optimized path compression process has been performed.

Figure 6:
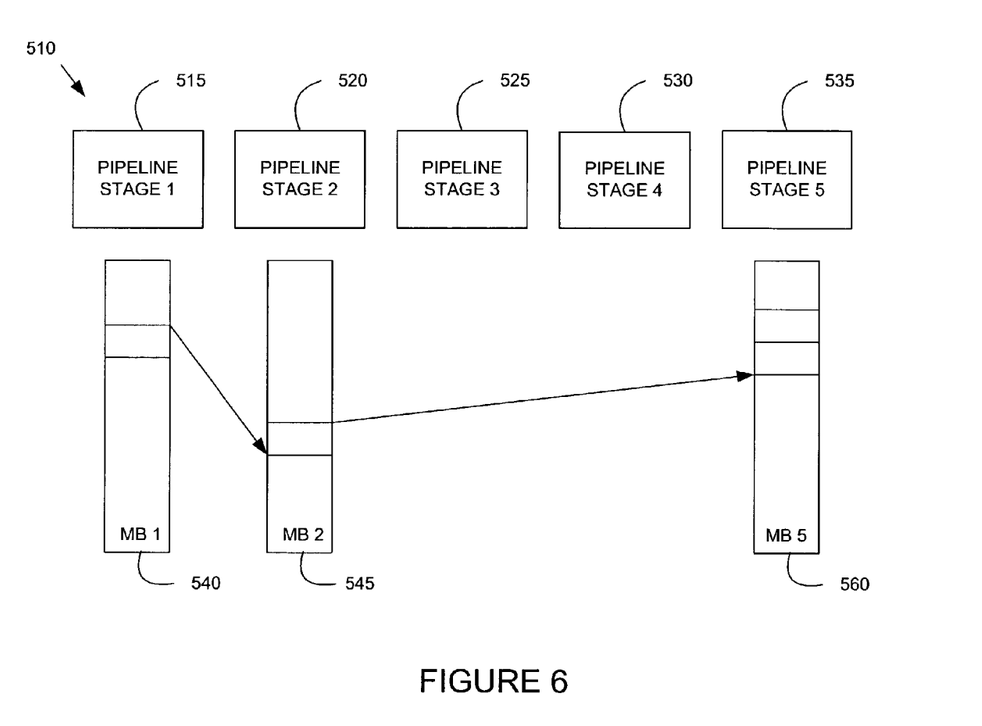
FIG. 6 illustrates a memory structure of a pipelined hardware bitmapped multi-bit trie algorithmic network search engine after the application of table expansion in accordance with the principles of the present invention.

After the optimized path compression process of the invention has been performed, the next trie table could be placed into a memory bank located in the next pipeline stage. However, in order to leave room for future expansion in case it becomes necessary to break the path compression optimization, it is preferable to place the next trie table into the memory bank in which the original trie table was in before the optimized path compression process was performed. FIG. 6 illustrates how the next trie table may be placed in memory bank 545 of memory structure 510 immediately following memory bank 540. This placement of the next trie table allows future table expansion to be made without moving existing data tables. This also means that there will be a place to put new trie tables when the optimized path compression process is not being employed.

For further explanation and clarification of the operation of the present invention, consider the following example. An exemplary data structure comprises the following set of prefixes, represented as grouped in an equal stride length of four.

| | | |
|---|---|---|
| P0: | 0011 1101 0010 1* | (1) |
| P1: | 0001 0100 0000 1001 0010 1101 001* | (2) |

-continued

| P2: | 0001 0100 0000 1001 0010 1101 0110 01* | (3) |
| P3: | 0001 0100 0000 1001 0010 1101 00* | (4) |
| P4: | 0001 0100 0000 1001 0010 1101 1* | (5) |
| P5: | 0001 0100 0000 1001 0010 1101 000* | (6) |

Figure 7:
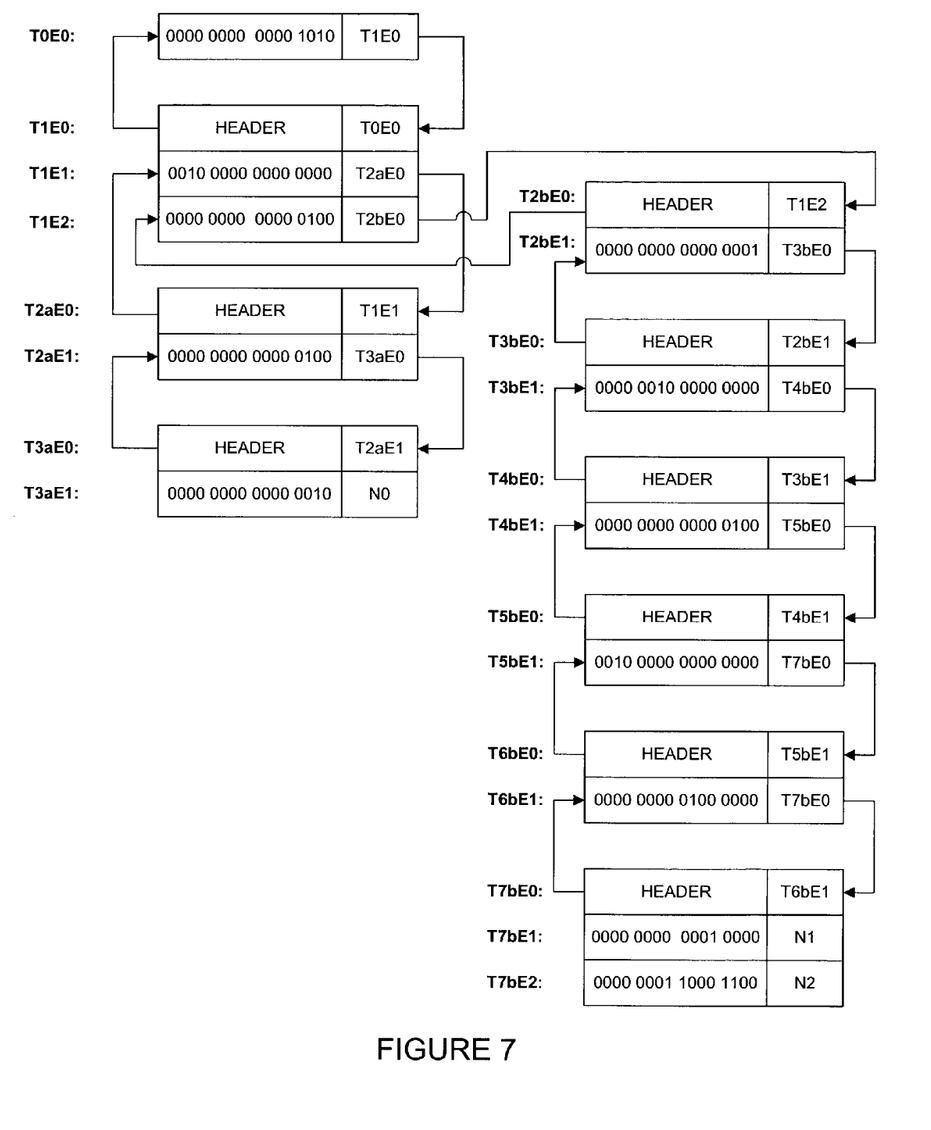
FIG. 7 illustrates an exemplary data structure that represents an exemplary set of six prefixes each having a stride length of four.

The bitmap that encodes a four (4) bit stride consists of sixteen (16) bits (two (2) to the power of four (4)). The data structure that represents the prefixes P0 through P5 is set forth in FIG. 7. In FIG. 7 the label Tn (where n is a number) denotes a table in pipeline stage n. The label En (where n is a number) denotes an entry in a table. For example, T0 represents the first level trie table (pipeline 1). T1 represents the second level trie table (pipeline 2). T1E1 and T1E2 represent data entry 0 and data entry 1 of table T1. T1E0 represents the T1 table header.

While each entry in a table may hold many fields, for purposes of explanation and clarity only two fields are shown in the entries shown in FIG. 7. The first is a bitmap field that indicates the number and positions of data entries in the next level or "child" table. The second is a pointer that holds the base address of the next level or "child" table.

Examining the data structure shown in FIG. 7, one sees two chains of non-leaf single entry trie tables. Table T2a is the only table in the first chain. Tables T2b, T3b, T4b, T5b and T6b form the second chain. Using the optimized path compression process of the invention it is possible to eliminate table T2 by modifying the T1E1 bitmap format. The T1E1 bitmap is replaced with the bit patterns "1101 0010" and its meaning is redefined by creating a type of format that indicates "path compression with one stride." During the search process the lookup logic will interpret the entry as a path compression entry that holds pattern "1101 0010" and handle the entry accordingly.

Figure 8:
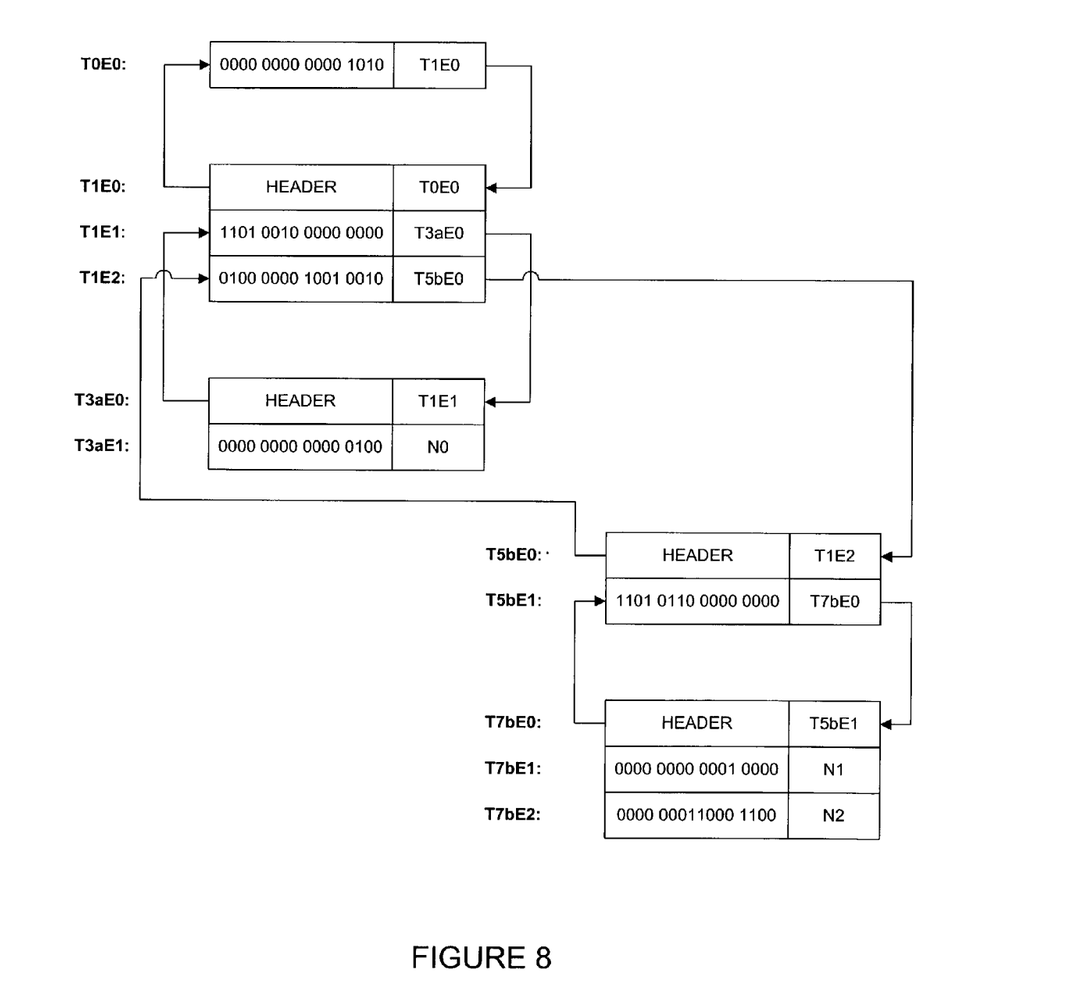
FIG. 8 illustrates the exemplary data structure shown in FIG. 7 after application of an optimized path compression process in accordance with the principles of the present invention.

Similarly, the optimized path compression process of the invention can be applied to the second chain of non-leaf single entry tables to eliminate the tables. In this case there are five (5) consecutive non-leaf single entry tables that represent six (6) strides of four (4) bit patterns. Because there are only sixteen (16) bits in the bitmap data field, only four (4) strides of patterns can be placed in one entry. The optimized path compression can be achieved by using two consecutive path compression tables. The first table hold four (4) strides of pattern (i.e., 0100 0000 1001 0010) and the second table holds the remaining two (2) strides (1101 0110). The result of applying these steps of the optimized path compression process is shown in FIG. 8.

The benefits of applying the optimized path compression process of the invention are quite apparent in this case. There are ten (10) tables in the original data structure shown in FIG. 7. These ten (10) tables contain twenty one (21) entries. After the optimized path compression process has been applied there are only five (5) tables that contain eleven (11) entries. The memory space saving is almost forty eight percent (48%).

In addition, the number of memory accesses needed to traverse the table is also significantly reduced. In the original structure in order to search prefix P0 it is necessary to perform four (4) memory accesses in four (4) pipeline stages. With the table in pipeline stage two (2) removed, the number of memory accesses required to traverse the new data structure is reduced to three (3) memory accesses.

Similarly, the necessity for memory accesses in pipeline stages two (2), three (3), four (4), and six (6) has been eliminated for searches on prefixes P1 through P5.

Figure 9:
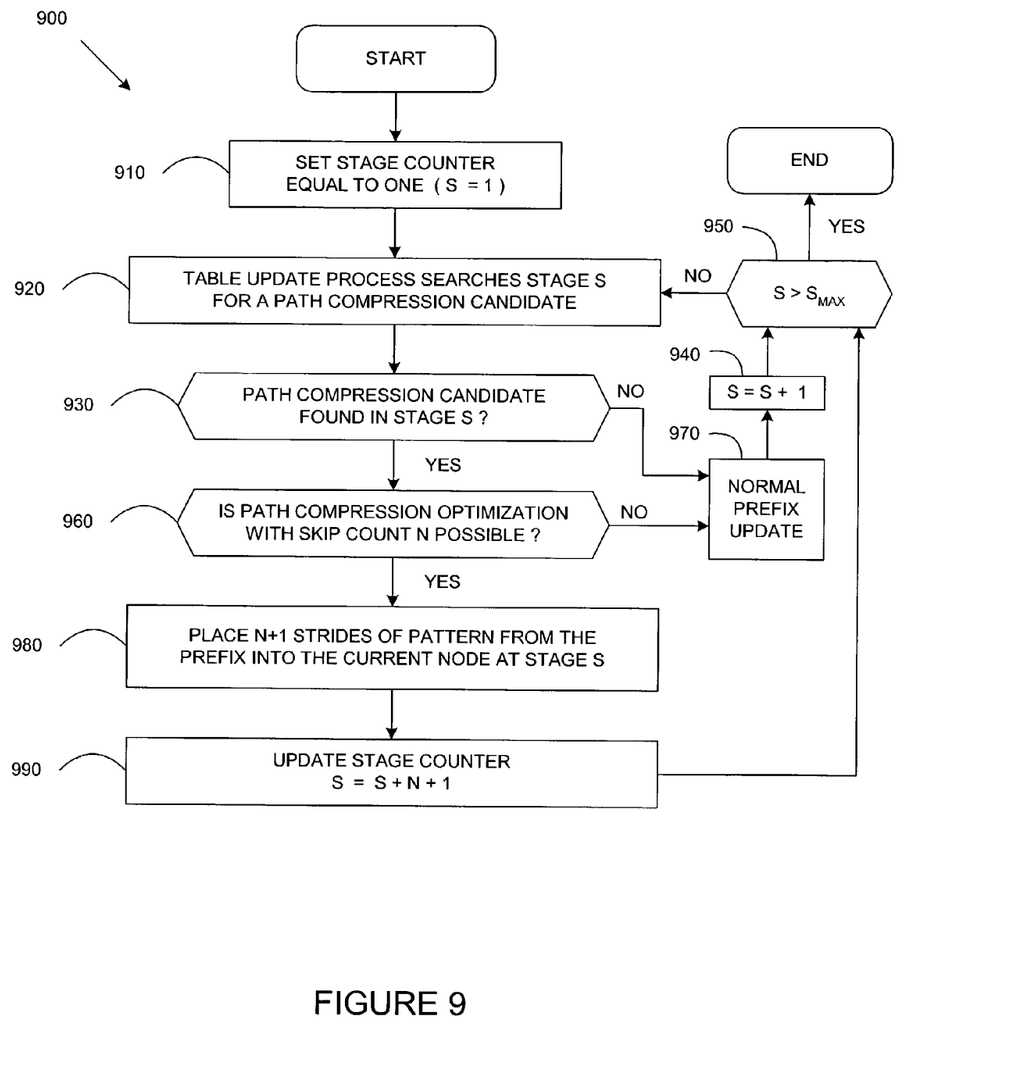
FIG. 9 illustrates a flow chart that shows an operation of an advantageous embodiment of a table update method of the present invention.

FIG. 9 illustrates a flow chart that shows the operation of an advantageous embodiment of a table update method of the present invention. The steps of the method shown in FIG. 9 are collectively referred to with reference numeral 900.

In the first step a stage counter S is set equal to one (step 910). A table update process then searches Stage S for a path compression candidate (step 920). Stage S is Stage 1 for the first stage. A determination is then made whether a path compression candidate has been found in Stage S (decision step 930). If no path compression candidate has been found in Stage S, then a normal prefix update is performed (step 970). The stage counter S is then incremented (step 940).

A determination is then made whether the newly incremented stage counter S exceed a maximum value of S denoted by $S_{MAX}$ (step 950). $S_{MAX}$ represents the maximum number of stages in the network search engine in question. If the stage counter is not greater than $S_{MAX}$ then control passes to step 920 and the next stage S is searched for a path compression candidate. If the stage counter is greater than $S_{MAX}$ then the table update method has been completed.

If a path compression candidate is found in stage S in step 930, then a determination is made whether path compression optimization with skip count N is possible (decision step 960). If no path compression optimization with skip count N is possible, then a normal prefix update is performed (step 970) and the method continues as previously described.

If a path compression optimization with skip count N is possible, then the method places N+1 strides of pattern from the prefix into the current node at stage S (step 980). The stage counter S is then updated to a value of S=S+N+1 (step 990). Control is then passed to step 950 for a comparison of the updated stage counter with the value $S_{MAX}$. The method then continues as previously described.

Figure 10:
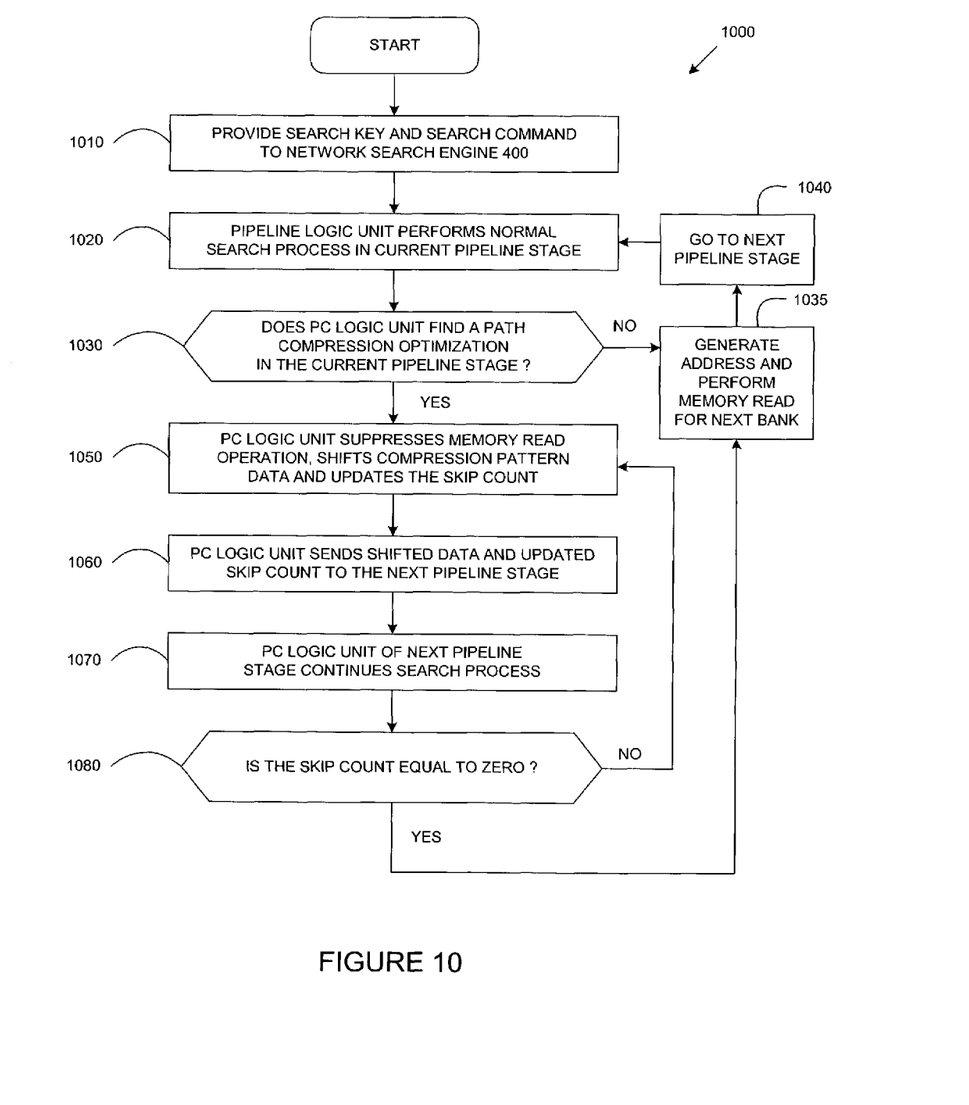
FIG. 10 illustrates a flow chart that shows the operation of an advantageous embodiment of a search method of the present invention.

FIG. 10 illustrates a flow chart that shows the operation of an advantageous embodiment of a search method of the present invention. The steps of the method shown in FIG. 10 are collectively referred to with reference numeral 1000.

The path compression pattern and the skip count have previously been encoded in the parent bitmap field. A search key and a search command are provided to a network search engine 400 of the present invention (step 1010). A pipeline logic unit performs a normal search process in a current pipeline stage (step 1020). A PC logic unit associated with the pipeline logic unit determines whether there is a path compression optimization in the current pipeline stage (decision step 1030). If a path compression optimization is not found in the current pipeline stage, the pipeline logic unit then generates an address and performs a memory read for the next bank (step 1035). Control then passes to the next pipeline stage (step 1040) and the next pipeline logic unit performs a normal search process in that pipeline stage (step 1020).

If a path compression optimization is found in the current pipeline stage, the PC logic unit suppresses the memory data read operation from the current memory bank, shifts the compression pattern data (and stores it in a shifted data storage unit), and updates the skip count (step 1050). The PC logic unit then sends to the pipeline logic unit of the next pipeline stage (1) the shifted data that is present in the current shifted data storage unit, and (2) the updated skip count (step 1060). The PC logic unit of the next pipeline stage continues the search process (step 1070). The PC logic unit of the next pipeline stage checks the value of the updated skip count to determine whether the value is equal to zero (decision step 1080). If the value of the updated skip count is not equal to zero, then control passes to step 1050 and the process is repeated. If the value of the updated skip count is equal to zero, then control passes to step 1035 and the process continues.

FIG. 10 is designed to illustrate how an advantageous embodiment of a search method of the present invention may be integrated with the normal search process of a network search engine. It is noted that, for clarity and ease of description, not all of the previously described steps of the normal search process have been shown in FIG. 10.

The optimized path compression process of the present invention incorporates a normally software-only optimization process into a pipelined hardware bitmapped multi-bit trie network search engine. The optimized path compression process of the present invention provides significant savings in memory space, memory bandwidth, and power consumption.

Embedding the common prefix bits ("path compression patterns") and the length of the pattern ("skip count") in the parent entry saves the memory space that is occupied by the single entry trie tables. It also saves the memory bandwidth and power associated with the memory space. The benefit is especially significant when the occurrence of non-leaf single entry tables is frequent, as in a sparsely populated routing table. The saving in memory space provided by the present invention may be as much as thirty percent (30%) to forty percent (40%) depending upon the sparseness of the data set. Further, the required changes in hardware complexity and extra area cost to implement the invention are insignificant.

Although the present invention has been described in detail, those skilled in the art should understand that they could make various changes, substitutions and alterations herein without departing from the spirit and scope of the invention in its broadest form.

What is claimed is:

1. An apparatus for optimizing path compression of at least one single entry trie table in a data structure in a pipeline hardware assisted bitmapped multi-bit trie algorithmic network search engine wherein said data structure comprises at least one parent trie table entry for said at least one single entry trie table, said at least one parent trie table entry comprising a path compression pattern that represents common prefix bits of a data packet and a skip count that represents a length of said path compression pattern, said apparatus comprising:

at least one PC logic unit coupled to at least one pipeline logic stage of said network search engine that is operable for detecting said path compression optimization; and wherein said at least one PC logic unit, in response to detecting said path compression optimization, is further operable for (1) suppressing a memory read operation to a memory bank associated with said at least one PC logic unit, wherein the suppression of the memory read operate prevents the transfer of memory data from the at least one PC logic unit and causes a shift in the data that represents the remainder of the compression pattern, and (2) updating a value of said skip count, and (3) sending an unprocessed portion of said path compression pattern and an updated value of said skip count to a next stage of said pipeline network search engine.

2. The apparatus of claim 1, wherein the at least one PC logic unit is further operable encoding in said at least one parent trie table entry said path compression pattern;

encoding in said at least one parent trie table entry said skip;

eliminating said at least one single entry trie table from said data structure by utilizing said path compression pattern and said skip count.

3. The apparatus as claimed in claim 2 wherein said at least one parent trie table entry in said data structure comprises:

a first trie table entry that comprises a pattern data field, a pointer data field and a code data field for a path compression pattern having a skip count of n strides; and wherein said path compression pattern is embedded in said pattern data field of said first trie table entry.

4. The apparatus as claimed in claim 3 wherein said at least one parent trie table entry in said data structure comprises:

a skip count of n strides; and wherein said skip count of n strides is embedded in said pattern data field of said first trie table entry.

5. The apparatus as claimed in claim 3 wherein said at least one parent trie table entry in said data structure comprises:

a second trie table entry that comprises a pattern data field, a count data field, a pointer data field and a code data field for a path compression pattern having a skip count from one stride to (n−1) strides; and wherein said path compression pattern is embedded in said pattern data field of said second trie table entry.

6. The apparatus as claimed in claim 5 wherein said at least one parent trie table entry in said data structure comprises:

a skip count from one stride to (n−1) strides; and wherein said skip count from one stride to (n−1) strides is embedded in said count data field of said second trie table entry.

7. The apparatus as claimed in claim 1 wherein:

at least one PC logic unit coupled to at least one pipeline logic stage of said network search engine is operable for determining that a value of said skip count equals zero;

wherein said at least one PC logic unit, in response to determining that a value of said skip count equals zero, is further operable for (1) reading memory data from a memory bank associated with said at least one PC logic unit for which said skip count equals zero, and (2) providing said memory data to a next stage of said pipeline network search engine.

8. The apparatus as claimed in claim 7 wherein said apparatus is operable for placing a trie table that represents a result of said path compression optimization into a memory bank into which an original trie table was to be placed before said path compression optimization was performed.

9. The apparatus as claimed in claim 2 wherein during said path compression optimization said apparatus is operable for minimizing utilization of one of: memory space, memory bandwidth and power consumption.

10. The apparatus as claimed in claim 1 wherein said at least one PC logic unit, in response to detecting said path compression optimization, is further operable for skipping said at least one stage of said pipeline network search engine associated with said at least one single entry trie table.

11. The apparatus as claimed in claim 1 comprising a plurality of PC logic units within said pipeline hardware assisted bitmapped multi-trie algorithmic network search engine, wherein said plurality of PC logic units are operable for processing said unprocessed portion of said path compression pattern one stride at a time in subsequent pipeline stages of said network search engine.

12. A method for optimizing path compression of at least one single entry trie table in a data structure in a pipelined hardware bitmapped multi-bit trie algorithmic network search engine wherein said data structure comprises at least one parent trie table entry for said at least one single entry trie table, said at least one parent trie table entry comprising a path compression pattern that represents common prefix bits of a data packet and a skip count that represents a length of said path compression pattern, said method comprising the steps:

searching for a path compression optimization in a plurality of stages of said pipeline network search engine;

detecting said path compression optimization in one stage of said pipeline network search engine;

suppressing a memory read operation to a memory bank associated with said one stage of said pipeline network search engine, wherein the suppression of the memory read operate prevents the transfer of memory data from the at least one PC logic unit and causes a shift in the data that represents the remainder of the compression pattern;

updating a value of said skip count; and sending an unprocessed portion of said path compression pattern and an updated value of said skip count to a next stage of said pipeline network search engine.

13. The method of claim 12, further comprising the steps of:

embedding in said at least one parent trie table entry said path compression pattern that represents common prefix bits of a data packet;

embedding in said at least one parent trie table entry said skip count that represents a length of said path compression pattern; and eliminating said at least one single entry trie table from said data structure utilizing said path compression pattern and said skip count.

14. The method as claimed in claim 13 wherein said step of embedding in said at least one parent trie table entry a path compression pattern that represents common prefix bits of a data packet comprises the steps of:

providing in said at least one parent trie table entry a first trie table entry that comprises a pattern data field, a pointer data field and a code data field for a path compression pattern having a skip count of n strides; and embedding said path compression pattern in said pattern data field of first trie table entry.

15. The method as claimed in claim 14 further comprising the steps of:

providing in said at least one parent trie table entry a skip count of n strides; and embedding said skip count of n strides in said pattern data field of said first trie table entry.

16. The method as claimed in claim 14 further comprising the steps of:

providing in said at least one parent trie table entry a second trie table entry that comprises a pattern data field, a count data field, a pointer data field and a code data field for a path compression pattern having a skip count from one stride to (n−1) strides; and embedding said path compression pattern having a skip count from one stride to (n−1) strides in said pattern data field of said second trie table entry.

17. The method as claimed in claim 16 further comprising the steps of:

providing in said at least one parent trie table entry a skip count from one stride to (n−1) strides; and embedding said skip count from one stride to (n−1) strides in said count data field of said second trie table entry.

18. The method as claimed in claim 12 further comprising the steps of:

determining in a stage of said pipeline network search engine that a value of said skip count equals zero;

reading memory data from a memory bank associated with said stage of said pipeline network search engine for which said skip count equals zero;

providing said memory data to a next stage of said pipeline network search engine.

19. The method as claimed in claim 18 further comprising the step of:

placing a trie table that represents a result of said path compression optimization into a memory bank into which an original trie table was to be placed before said path compression optimization was performed.

20. The method as claimed in claim 12 further comprising the step of:

providing a plurality of PC logic units within said pipelined hardware bitmapped multi-bit trie algorithmic network search engine; and processing said unprocessed portion of said path compression pattern one stride at a time in subsequent pipeline stages of said network search engine.

21. The method as claimed in claim 12 further comprising the steps of:

detecting a path compression candidate in a stage of said pipeline network search engine;

determining that a path compression optimization with a skip count of N is possible for said path compression candidate; and updating a prefix table in said pipeline network search engine by placing N plus one strides of pattern from a prefix into a current node at a current stage of said pipeline network search engine.

* * * * *